United States Patent
Hsieh et al.

(10) Patent No.: US 9,627,916 B2
(45) Date of Patent: Apr. 18, 2017

(54) ELECTRONIC CARD WITH A CHARGING MECHANISM

(71) Applicant: SiPix Technology Inc., Taoyuan County (TW)

(72) Inventors: Yao-Jen Hsieh, Hsinchu County (TW); Ming-Jong Jou, Hsinchu (TW); Chi-Mao Hung, Hsinchu (TW); Wei-Min Sun, Taipei (TW)

(73) Assignee: E Ink Holdings Inc., Hsinchu (TW)

( * ) Notice: Subject to any disclaimer, the term of this patent is extended or adjusted under 35 U.S.C. 154(b) by 365 days.

(21) Appl. No.: 13/917,619

(22) Filed: Jun. 13, 2013

(65) Prior Publication Data
US 2014/0062391 A1    Mar. 6, 2014

(30) Foreign Application Priority Data
Aug. 31, 2012    (TW) .............................. 101131790 A

(51) Int. Cl.
| | |
|---|---|
| H02J 7/00 | (2006.01) |
| H02J 7/02 | (2016.01) |
| H02J 50/00 | (2016.01) |
| H02J 50/10 | (2016.01) |

(52) U.S. Cl.
CPC .............. *H02J 7/025* (2013.01); *H02J 50/00* (2016.02); *H02J 50/10* (2016.02)

(58) Field of Classification Search
CPC ............. H02J 7/025; H02J 50/00; H02J 50/10
USPC ........................................................ 320/108
See application file for complete search history.

(56) References Cited

U.S. PATENT DOCUMENTS

| | | | | |
|---|---|---|---|---|
| 6,465,880 | B1 * | 10/2002 | Dobashi | G06K 19/07726 257/679 |
| 6,603,286 | B2 * | 8/2003 | Herrmann | H02J 7/0075 320/134 |
| 6,967,462 | B1 * | 11/2005 | Landis | 320/101 |
| 7,834,743 | B2 * | 11/2010 | Nagata et al. | 340/10.4 |
| 8,811,897 | B2 * | 8/2014 | Matsumoto et al. | 455/41.1 |
| 2008/0252254 | A1 * | 10/2008 | Osada | 320/108 |
| 2010/0156347 | A1 * | 6/2010 | Lee et al. | 320/108 |
| 2010/0259216 | A1 * | 10/2010 | Capomaggio | 320/108 |

(Continued)

FOREIGN PATENT DOCUMENTS

| | | |
|---|---|---|
| TW | 566629 | 12/2003 |
| TW | M405059 | 6/2011 |
| WO | WO2011132471 | * 10/2011 |

OTHER PUBLICATIONS

"Office Action of Taiwan Counterpart Application", issued on Jun. 17, 2014, p. 1-p. 8, in which the listed references were cited.

*Primary Examiner* — Nathaniel Pelton
(74) *Attorney, Agent, or Firm* — Jianq Chyun IP Office

(57) ABSTRACT

An electronic card including an antenna, a chip, a charging circuit and a battery is provided. The antenna receives an external electric signal, and the chip is coupled to the antenna, so as to receive the external electric signal and provide a demodulated electric signal. The charging circuit is coupled to the chip, receives the demodulated electric signal and converts the demodulated electric signal to generate a charging power. The battery is coupled to the charging circuit, wherein, the charging circuit provides the charging power to the battery according to a residual electricity of the battery, so as to charge the battery.

6 Claims, 3 Drawing Sheets

(56) References Cited

U.S. PATENT DOCUMENTS

| | | | |
|---|---|---|---|
| 2012/0293008 A1* | 11/2012 | Park | H02M 1/14 |
| | | | 307/104 |
| 2012/0303939 A1* | 11/2012 | Cain et al. | 713/1 |
| 2012/0320329 A1* | 12/2012 | Lee et al. | 349/158 |
| 2012/0326662 A1* | 12/2012 | Matsumoto | H02J 7/025 |
| | | | 320/108 |
| 2013/0057078 A1* | 3/2013 | Lee et al. | 307/104 |
| 2013/0288600 A1* | 10/2013 | Kuusilinna et al. | 455/41.2 |

* cited by examiner

ELECTRONIC CARD WITH A CHARGING MECHANISM

CROSS-REFERENCE TO RELATED APPLICATION

This application claims the priority benefit of Taiwan application serial no. 101131790, filed on Aug. 31, 2012. The entirety of the above-mentioned patent application is hereby incorporated by reference herein and made a part of this specification.

TECHNICAL FIELD

The invention relates to an electronic card, and more particularly, to a charging mechanism of an electronic card.

BACKGROUND

As semiconductor technology develops, a type of electronic cards so-called smart card has been applied widely in various areas of daily life. For example, smart cards may be utilized as an electronic wallet, so that people may not need to carry large amount of money for shopping. In addition, as an example, smart cards may also be utilized as the required tickets when people are travelling by public transports, such that the required waiting-time for purchasing tickets may be reduced significantly, and meanwhile, the time waste caused by inspecting tickets manually may also be reduced.

Smart cards with more functions have also been proposed with the increasing popularization of smart cards. Thus, some of smart cards are required a built-in battery, in order to provide the power when the smart card is implementing a particular function. However, in the prior art, when the electricity of the battery in a smart card is completely consumed, the user must replace the currently used smart card. In other words, the user is possibly required to replace the used smart card regularly, thereby causing the usage inconvenience of electronic cards.

SUMMARY

Accordingly, the invention is directed to an electronic card capable of charging a battery in the electronic card via an external electric signal received by an antenna.

The invention provides an electronic card, which includes an antenna, a chip, a charging circuit and a battery. The antenna receives an external electric signal, and the chip is coupled to the antenna, so as to receive the external electric signal from the antenna and provide a demodulated electrical signal. The charging circuit is coupled to the chip, receives the demodulated electric signal from the chip and converts the demodulated electric signal to generate a charging power. The battery is coupled to the charging circuit, wherein the charging circuit provides the charging power to the battery according to a residual electricity of the battery, so as to charge the battery.

In an embodiment of the invention, the electronic card further includes a controller. The controller is coupled to the chip and the charging circuit. The controller activates the charging circuit to charge the battery according to the residual electricity, through the charging circuit detects the residual electricity of the battery.

In an embodiment of the invention, the electronic card further includes a display module which is coupled to the controller. The display module displays the residual electricity of the battery through the controller.

In an embodiment of the invention, the display module is an electophoretic display module.

In an embodiment of the invention, the antenna is an annular coil disposed surroundingly on the electronic card.

In an embodiment of the invention, the charging circuit includes a power converter. The power converter is coupled to the chip and configured to receive and convert the demodulated electric signal to generate the charging power.

In an embodiment of the invention, the charging circuit further includes an electricity detector. The electricity detector is coupled to the battery and configured to detect the residual electricity of the battery.

In an embodiment of the invention, the charging circuit provides the charging power to charge the battery when the residual electricity is less than a predetermined electricity.

In an embodiment of the invention, the charging circuit cuts off a path providing the charging power to the battery when the residual electricity is not less than the predetermined electricity.

According to above descriptions, the chip in the electronic card of the invention receives the external electric signal received by the antenna, and the charging circuit converts the demodulated electric signal into the charging power, so as to charge the battery in the electronic card. In this way, the electronic card may not need to be changed due to the electricity exhaustion of the battery, thereby improving the lifetime of the electronic card.

In order to make the features and advantages of the present invention more comprehensible, the present invention is further described in detail in the following with reference to the embodiments and the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
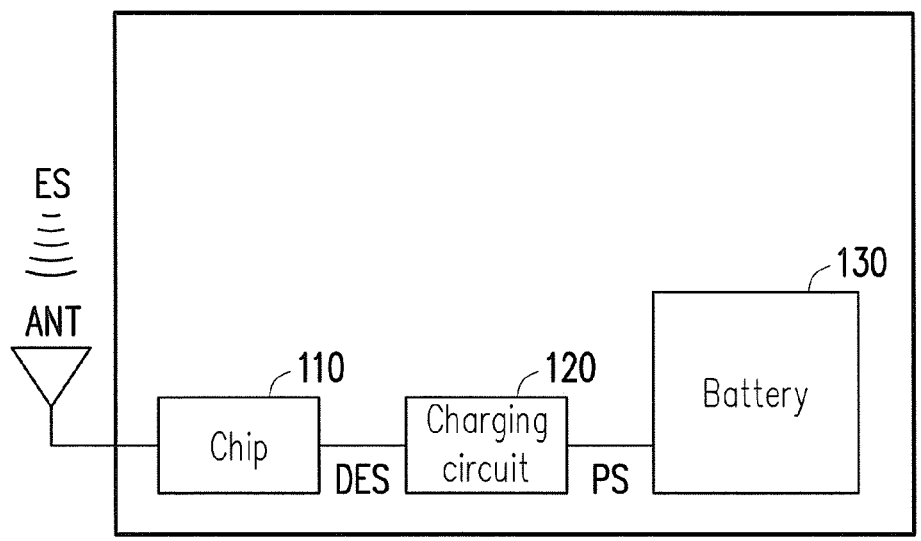
FIG. 1 is a schematic diagram illustrating an electronic card 100 according to an embodiment of the invention.

Referring to FIG. 1, FIG. 1 is a schematic diagram illustrating an electronic card 100 according to an embodiment of the invention. The electronic card 100 includes an antenna ANT, a chip 110, a charging circuit 120 and a battery 130. In the embodiment, the antenna ANT receives an external electric signal ES. The chip 110 is coupled to the antenna ANT, so as to receive the external electric signal ES received by the antenna ANT and provide a demodulated electric signal. The charging circuit 120 is coupled to the chip 110. The charging circuit 120 receives the demodulated electric signal ES, performs power conversion to the demodulated electric signal ES, and converts the demodulated electric signal ES to generate a charging power PS. The battery 130 is coupled to the charging circuit 120, moreover, the charging circuit 120 determines whether the charging power PS is transmitted to the battery 130 according to a residual electricity of the battery 130, so as to charge the battery 130.

To be specific, when the chip 110 receives the external electric signal ES via the antenna ANT, the chip 110 may provide the demodulated electric signal ES to the charging circuit 120, so that the charging circuit 120 converts the demodulated electric signal ES into the charging power PS. Meanwhile, the charging circuit 120 may determine whether the residual electricity in the battery 130 is below a predetermined electricity, moreover, when the residual electricity of the battery 130 is less than the predetermined electricity, the charging circuit 120 provides the charging power PS to the battery 130, so as to charge the battery 130. On the other hand, if the charging circuit 120 determines the residual electricity of the battery 130 is not less than the predetermined electricity, the charging circuit 120 stops charging the battery 130.

It should be noted that, the charging circuit 120 in the embodiments may determine whether to provide the charging power PS to the battery 130 according to the amount of the residual electricity of the battery 130. In this way, the battery 130 may not be damaged or danger of explosion due to excess electricity.

It should be noted that, the chip 110 in the embodiments may be utilized the security chip in the common smart cards to construct, and may not be needed to dispose additional chips.

Figure 2:
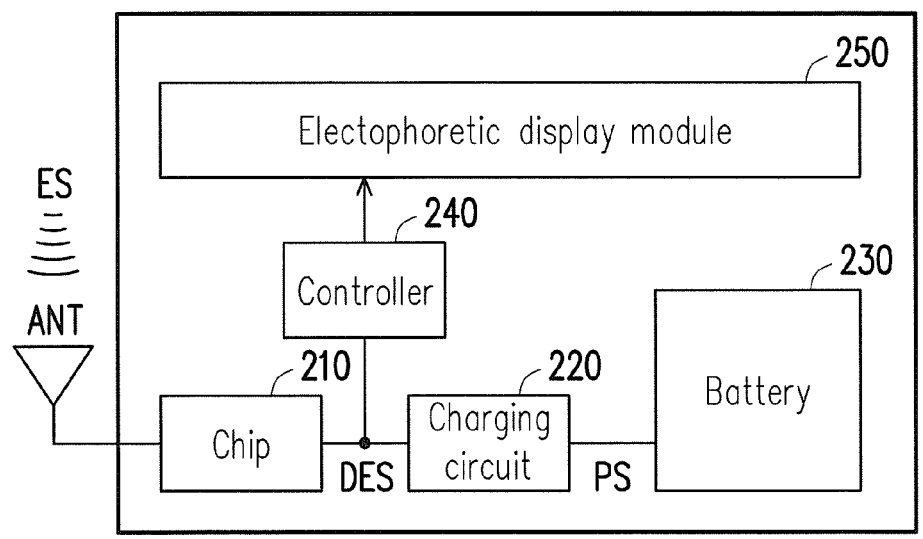
FIG. 2 is a schematic diagram illustrating an electronic card 200 according to another embodiment of the invention.

Referring to FIG. 2, FIG. 2 is a schematic diagram illustrating an electronic card 200 according to another embodiment of the invention. The electronic card 200 includes an antenna ANT, a chip 210, a charging circuit 220, a battery 230, a controller 240 and a display module constructed by an electophoretic display module 250. The difference between the two embodiments is that the electronic card 200 further includes the electophoretic display module 250 and the controller 240. Wherein, the controller 240 is coupled to the chip 210, the charging circuit 220 and the electophoretic display module 250. The controller 240 activates the charging circuit 220 to charge the battery 230 according to the residual electricity, through the charging circuit 220 detects the residual electricity of the battery 230. The controller 240 may receive the data that is received by the antenna ANT and transmitted to the chip 210. Moreover, the controller 240 may also provide the display data to the electophoretic display module 250, so that the electophoretic display module 250 displays the related information in the electronic card 200. Moreover, the controller 240 of the embodiment is also coupled to the charging circuit 220, and the information of the residual electricity of the battery 230 may be obtained by the charging circuit 220. In other words, the controller 240 may provide the information of the residual electricity of the battery 230 to the electophoretic display module 250, and thus the electophoretic display module 250 displays the residual electricity of the battery 230 through the controller 240. The user may also be informed whether the batter 230 is charging via the display of the electophoretic display module 250.

Figure 3:
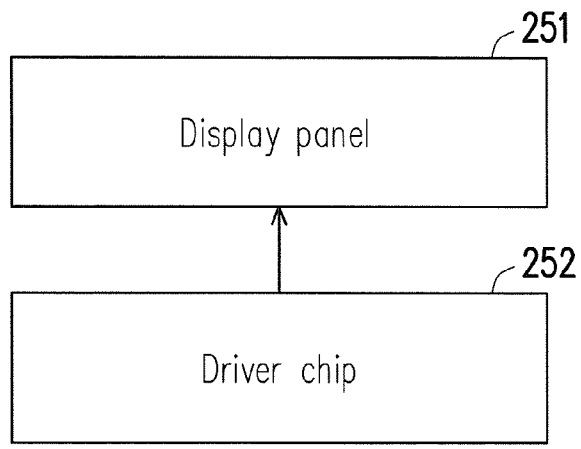
FIG. 3 is a schematic diagram illustrating an implementation of an electophoretic display module 250 according to an embodiment of the invention.

Referring to FIG. 3 with the following description, FIG. 3 is a schematic diagram illustrating an implementation of an electophoretic display module 250 according to an embodiment of the invention. In the embodiment, the electophoretic display module 250 includes a display panel 251 and a driver chip 252, where the display panel 251 is an electophoretic display panel. Wherein, the display panel 251 and the driver chip 252 are coupled with each other, and the driver chip 252 is coupled to the controller 240 as shown in FIG. 2. The driver chip 252 generates a corresponding driving signal according to the display data provided by the controller 240, so as to drive the display panel 251 to display. It should be noted that, the details of the driver chip 252 generates the corresponding driving signal according to the display data, is well known to those skilled in the art therefore will not be described herein.

It should be noted that, the controller 240 shown in FIG. 2 may also be integrated to dispose in the driver chip 252 shown in FIG. 3.

Figure 4:
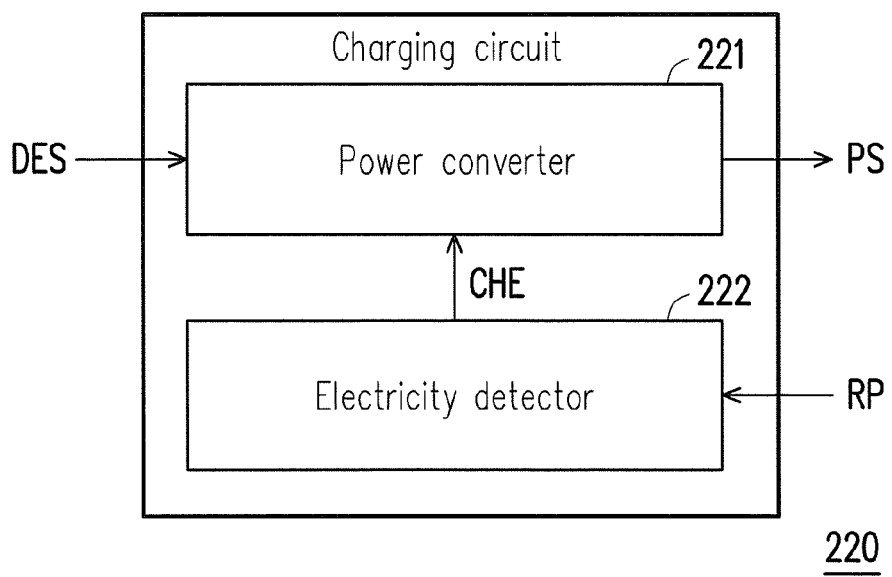
FIG. 4 illustrates an implementation of a charging circuit 220 according to an embodiment of the invention.

Next, referring to FIG. 2 and FIG. 4, wherein, FIG. 4 illustrates an implementation of a charging circuit 220 according to an embodiment of the invention. The charging circuit 220 includes a power converter 221 and an electricity detector 222. An input terminal of the power converter 221 is coupled to the chip 210 to receive the demodulated electric signal ES, moreover, an output terminal of the power converter 221 is coupled to the battery 230 to provide the charging power PS. The power converter 221 may perform such as alternating current (AC) to direct current (DC) power converting to the received demodulated electric signal ES, and generate a direct current charging power PS.

The electricity detector 222 is coupled to the battery 230 in the electronic card 200, so as to detect a residual charge RP in the battery 230. The electricity detector 222 may be informed the amount of the residual charge RP by measuring the voltage value at the coupling terminal of the battery 230 in the electronic card 200. Moreover, the electricity detector 222 may compare the residual charge RP with the predetermined electricity to generate a charging enable signal CHE. In brief, when the electricity detector 222 determines the residual charge RP is less than the predetermined electricity, it indicates that the electricity of the battery 230 needs to be recharged and the electricity detector 222 generates an enabled (for example, equivalent to a logic high level) charging enable signal CHE correspondingly. Contrarily, when the electricity detector 222 determines the residual charge RP is greater than or equal to the predetermined electricity, it indicates that the electricity of the battery 230 is enough without the need to be recharged and the electricity detector 222 generates a disabled (for example, equivalent to a logic low level) charging enable signal CHE correspondingly.

The charging enable signal CHE is provided to the power converter 221. The power converter 221 determines the enabled or disabled state of the received charging enable signal CHE, to decide whether to provide the charging power PS to the battery 230. In other words, when the charging enable signal CHE is at the enabled state, the power converter 221 implements the power conversion and provides the generated charging power PS to the battery 230, so that the battery 230 charges according to the charging power PS. Contrarily, when the charging enable signal CHE is at the disabled state, the power converter 221 stops providing the charging power PS to the battery 230.

Here, it should be noted that, when the charging enable signal CHE is at the disabled state, the power converter 221 may stop performing the power conversion thereof, in order to save the power consumption. Moreover, the power converter 221 may further cut off a path that provides the charging power PS to the battery 230 according to the disabled state of the charging enable signal CHE, and concurrently, it may prevent the charges stored in the battery 230 flowing back to the power converter 221, which may cause the charges wasted unnecessarily.

The numerical value for the aforementioned predetermined electricity may be pre-set by the designer according to the state of each element, such as the minimum electricity required to provide the electronic card 200 and/or the maximum electricity capable of storing in the battery 230, etc.

Figure 5:
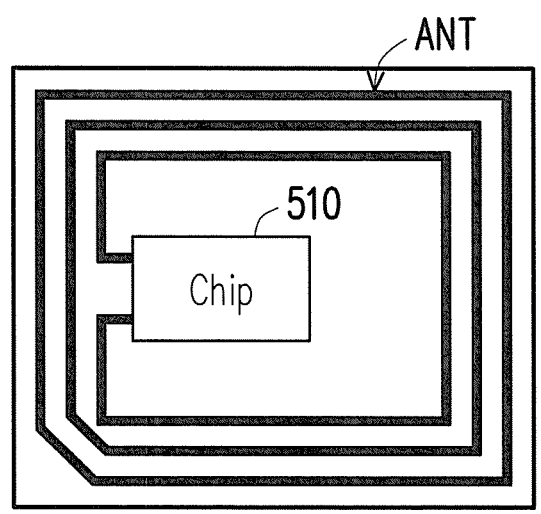
FIG. 5 is a schematic diagram illustrating an antenna ANT configuration of an electronic card 500 according to an embodiment of the invention.

Referring to FIG. 5 with the following description, FIG. 5 is a schematic diagram illustrating an antenna ANT configuration of an electronic card 500 according to an embodiment of the invention. In the electronic card 500, the antenna ANT is coupled to a chip 510. Moreover, the antenna ANT is constructed by utilizing the metal wire to dispose on a surface of the electronic card 500 in a surrounded manner. In an embodiment of the invention, the antenna is an annular coil disposed surroundingly on the electronic card. Certainly, the configuration of the antenna ANT shown in FIG. 5 is only an example. Any configurations of the antenna known to those skilled in the art may be applied to the invention.

According to the above descriptions, the invention provides the charging circuit to convert the external electric signal received by the antenna into the charging power, and provides the charging power to charge the battery in the electronic card. In this way, while the electronic card is used, the battery thereof may be charged synchronously, thereby extending the lifetime of the electronic card until the disposed battery therein is damaged.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic card, comprising:
   an antenna, receiving an external electric signal;
   a chip, coupled to the antenna, receiving the external electric signal via the antenna and providing a demodulated electric signal to a charging circuit;
   the charging circuit, coupled to the chip, receiving the demodulated electric signal and converting the demodulated electric signal to generate a charging power; and
   a battery, coupled to the charging circuit,
      wherein, the charging circuit provides the charging power to the battery for charging the battery according to a residual electricity of the battery
   wherein the charging circuit comprises:
      a power converter, coupled to the chip and configured to receive and convert the demodulated electric signal to generate the charging power; and
      an electricity detector, coupled to the battery and configured to detect the residual electricity in the battery,
      wherein the electricity detector generates a disabled charging enable signal such that the power converter stops generating the charging power when the residual electricity in the battery is greater than or equal to a predetermined electricity, wherein the disabled charging enable signal is generated in the same electronic card as the electronic card that the battery locates; and
      the electricity detector generates an enabled charging enable signal such that the power converter generates the charging power when the residual electricity in the battery is less than the predetermined electricity, wherein the power converter and the electricity detector locates in the same electronic card.

2. The electronic card as claimed in claim 1, further comprising:
   a controller, coupled to the chip and the charging circuit, where the controller activates the charging circuit to charge the battery according to the residual electricity, through the charging circuit detects the residual electricity of the battery.

3. The electronic card as claimed in claim 2, further comprising:
   a display module, coupled to the controller,
   wherein the display module displays the residual electricity of the battery through the controller.

4. The electronic card as claimed in claim 3, wherein the display module is an electophoretic display module.

5. The electronic card as claimed in claim 1, wherein the antenna is an annular coil disposed surroundingly on the electronic card.

6. The electronic card as claimed in claim 1, wherein the charging circuit cuts off a path providing the charging power to the battery when the residual electricity is not less than the predetermined electricity.

* * * * *